May 3, 1932.  J. B. HARRIS, JR  1,857,083
COLOR PHOTOGRAPHY
Filed May 7, 1930
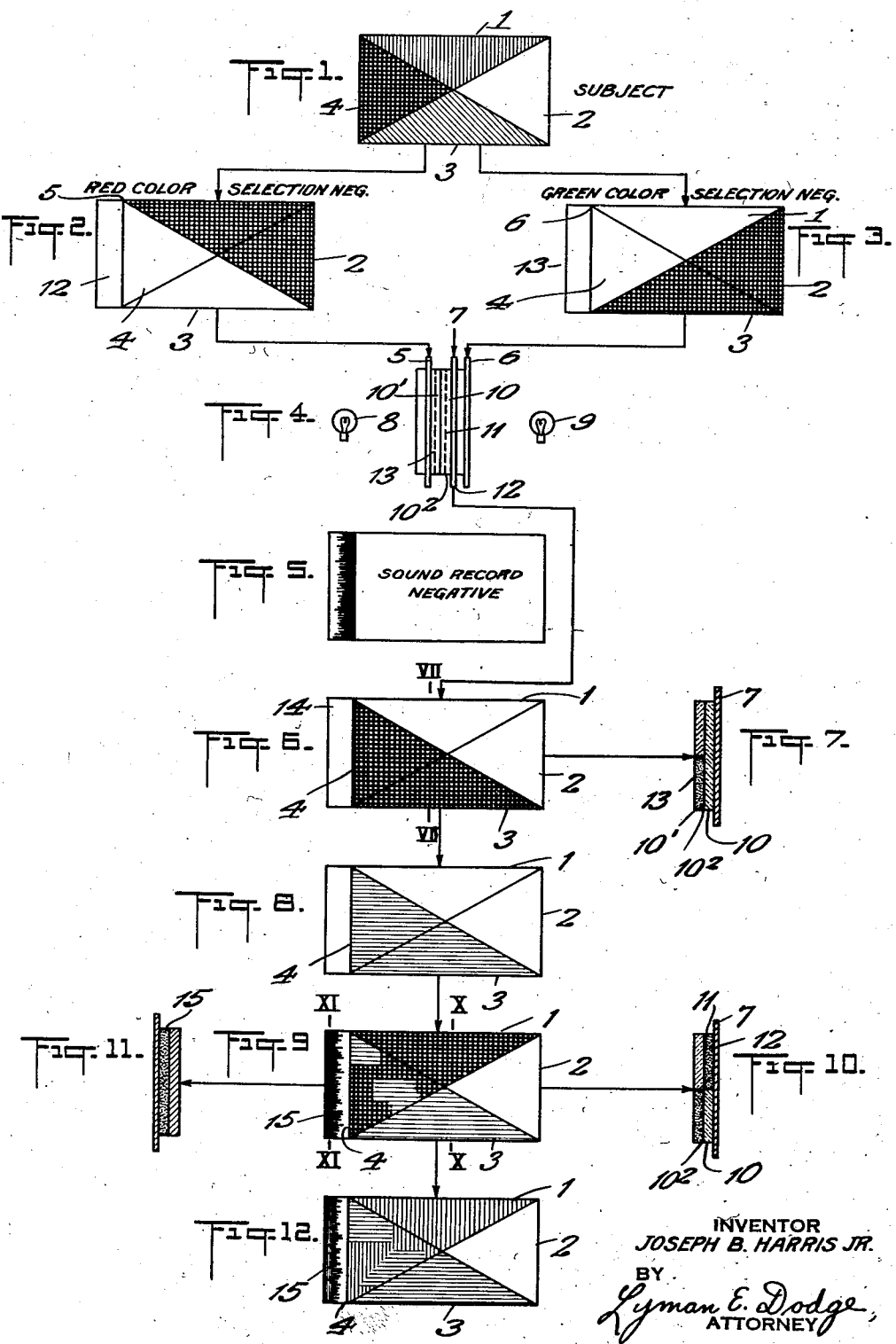

Patented May 3, 1932

1,857,083

UNITED STATES PATENT OFFICE

JOSEPH B. HARRIS, JR., OF LOS ANGELES, CALIFORNIA

COLOR PHOTOGRAPHY

Application filed May 7, 1930. Serial No. 450,350.

This invention relates to sound, particularly the recordation of sound, and especially such recordation upon a photographic film.

It is well understood by those skilled in photography that sound waves may be transformed into light waves which may be caused to so act upon a photographic film that a record may be obtained which may then, by suitable apparatus, be caused to so act upon a beam of light that the light may be transformed, as it were, back into a sound corresponding to the original sound.

The ordinary photographic film record of a sound is not as sharp as desired.

A principal object of applicant's invention is a method by which the so called "sound-track" upon a photographic film may be rendered sharper and the whole image more intense so that a greater range of volume of more sharply differentiated sounds may be obtained by the use of the film.

Other objects and advantages will appear as the description of the best known mode of practicing the method progresses and the novel features thereof will be particularly pointed out in the appended claims.

In describing the invention in detail, and a particular physical product, resulting from the application of the method, selected to illustrate the invention, reference is had to the accompanying drawings wherein has been illustrated a particular physical product resulting from the practice and application of the invention and wherein like characters of reference designate corresponding parts throughout the several views, and in which:

Figure 1 is a schematic representation of a subject; Fig. 2 is a schematic representation of a red color selection negative representative of the reds in the subject, Fig. 1; Fig. 3 is a green color selection negative representative of the greens in the subject, Fig. 1; Fig. 4 is a schematic illustration showing the position of the positive print stock and negatives during the printing; Fig. 5 is a schematic representation of sound record negative; Fig. 6 is a schematic representation of the positive print after the surface image has been developed; Fig. 7 is a cross-sectional view on the line VII—VII of Fig. 6, illustrating the position in the emulsion of the first developed image; Fig. 8 is a schematic view illustrating the print, Fig. 6, after being toned; Fig. 9 is a schematic view illustrating the print, Fig. 8, after the second development; Fig. 10 is a cross-sectional view on the line X—X of Fig. 9, illustrating the position in the emulsion of the second developed image; Fig. 11 is a cross-sectional view on the line XI—XI of Fig. 9, illustrating the position in the emulsion of the developed sound-track; Fig. 12 is a schematic representation of Fig. 9 after being toned.

In order to explain and illustrate my method I have shown it used in conjunction with the formation of a colored photograph, as this example not only illustrates my method of intensifying and rendering clearer the sound-track but also illustrates how such a method may be used in conjunction with the method for making a colored photograph.

The subject selected for reproduction, and shown by Fig. 1, is represented as a rectangle divided by two diagonal lines forming four triangles. One triangle 1, is colored red; another 2, is white; another, 3, is colored green; and the fourth, 4, is black.

The first step in carrying out applicant's process is to secure two color selection negatives of the subject, Fig. 1. This is done in the usual and well known manner. The finished red color selection negative designated as a whole by 5, is illustrated by Fig. 2. As the red color selection negative, Fig. 2, is a negative made from the subject, 1, then, in accordance with the usual methods, the triangle 1 will be black; the triangle 2 will be black; the triangle 3 will be white; and the triangle 4 will be white. The finished green color selection negative, designated as a whole by 6, is illustrated by Fig. 3. In this negative, the triangle 1 will be white; the triangle 2 will be black; the triangle 3 will be black; and the triangle 4, white. Each of the color selection negatives, Figs. 2 and 3, also show blank spaces, one designated 12 the other 13. These blank spaces merely represent that portion of the width of a standard motion picture photograph film which is set aside for the sound-track, and blanked out on exposure of the negative.

In case either simultaneous or successive printing is employed applicant prefers to use a print stock having two emulsions, of well known light sensitive silver salt, thereon on the same side with a layer of light retarding dye between the two emulsions. The dye used might well be a yellow dye such as tartrazin, that is, referring to Fig. 4 the positive stock 7 would have two emulsions, 10 and 10' thereon separated by a layer $10^2$ of light retarding dye. By using said positive film stock and properly regulating the printing lights 8 and 9, two registered independent images may be simultaneously formed in the emulsions 10 and 10'. One image, that formed from negative 6 would, as indicated in dotted lines in Fig. 4, and designated 11, lie substantially adjacent the transparent, generally, celluloid carrier 12, and would be in the emulsion 10; the other image, indicated by dotted lines 13, would lie in the emulsion 10'. These substantially separated positions of the two images can, of course, be obtained as well by successive printing.

After the completion of the printing of the latent images in the positive stock 7, it is again put through a printer in contact with the sound record negative, Fig. 5, with the sound record negative occupying the position corresponding to that occupied by the green color selection negative, Fig. 6, as shown in Fig. 4, so that a latent image of the sound record would be formed in the positive print stock 7 in a plane corresponding to the latent image 11 of Fig. 4. This latent image would only be formed in that area designated 14 in Fig. 6, that is, the sound-track area and in order to render this sound-track area free for the sound-track when the printing Fig. 4, is done, this area would be blanked out by suitable and appropriate means in the printer so that neither light 8 or 9 could act thereon and when the printing is done from sound record negative, Fig. 5, the portion other than the sound track area would be blanked out so that lights 8 or 9 could not act upon the area of the positive stock which is to bear the subject image, all of which is well understood and common practice.

When the latent images have been formed in the positive 7 it will then be developed. This development will be so arranged that the image 13 will be first developed without action on the interior image 11. In order to so do applicant prefers to use a developer as follows: 18 grams hydroquinone, 100 grams sodium sulphite, 4½ grams potassium bromide, 18 grams sodium hydrate, 1000 ccs. water.

This developer will give rapidly a satisfactory black and white image from the image 13, so that the print, Fig. 6, after development will appear white in triangle 1; white in triangle 2; black in triangle 3; and black in triangle 4 and the developed image giving the blacks will be as shown at 13, in Fig. 7.

The positive stock is next washed and then toned. A suitable toning solution would be as follows: 3 grams ferric ammonium oxalate, 3 grams potassium ferricyanide, 3 grams citric acid, 500 ccs. water.

The toning bath would be allowed to act for such a time as would give a desired density of color. The print would then appear as shown in Fig. 8. Too great acidity in this bath is to be avoided.

After a thorough wash the film is placed in a bath as follows: 10 grams potassium bichromate, 10 grams ammonium bromide, 1000 ccs. water.

The bichromate clearing bath would be allowed to act for about 10 minutes and then the print would be thoroughly washed. This clearing bath tends to restore the sensitivity to developer of undeveloped exposed silver salts which may have been rendered undevelopable by previous treatments.

After washing, the print would be subjected to a second development. The developer used would be a slow working developer. One designed to bring out the interior image to the fullest extent. A suitable developer would be as follows: 5 grams diamidophenol, 60 grams sodium sulphite, 5 ccs. latic acid, 1000 ccs. water.

After the developer is allowed to act the proper time to fully develop the latent image formed adjacent the carrier, that is, in the emulsion 10, the film is thoroughly washed and fixed in a thiosulfate bath and then washed. The print will then appear as shown in Fig. 9, in which: triangle 1 will be black; triangle 2 will be white; triangle 3 will be blue; and triangle 4 will contain both blue and black. The position of the black image of Fig. 9 is shown by Fig. 10 in which 11 indicates the image developed by the second development. This image is adjacent the carrier 12.

The sound-track image rendered black by the second development is shown in Fig. 9 at 15 and in cross-section in Fig. 11.

The print will then be toned by the use of any suitable toning solution such as: 50 grams sodium citrate, 10 grams cupric sulphate, 5 grams potassium ferricyanide, 1000 ccs. water.

After the print is washed and dried it will then appear as shown in Fig. 12 in which: triangle 1 will be red, triangle 2, white; triangle 3, blue; triangle 4, blue and red which by transmitted light would be black; and sound-track 15 would be red.

When the positive Fig. 12 is projected in the usual manner in a projection machine provided with a sound head, that is, means for passing light through the sound-track 15 to be transformed into sound, the colored sound image 15 will be much more effective than the ordinary black and white sound-track image, in that, it will be more intense and sharper in cutting off the light so that the resulting sound produced will be of greater volume and sharper, that is, less overlapping and undesired prolongation of sound.

Although the new method for improving the quality of sound-track on photography film has been illustrated and described in this application in connection with a method of forming a color photograph, nevertheless, it must be understood that the sound-track alone may be treated by the cupric sulphate containing toning solution in order to improve its quality without coloring either one or both of the subject images, as by immersion of the film sidewise to a depth just sufficient to cover the sound-track area 14 or any other suitable or appropriate method as by painting the sound-track with a toning solution by means of a small camel's hair brush and following this treatment with the necessary fixing solutions and washes.

It is, of course, to be understood that the showing and description of a variable area sound-track is not meant to exclude a variable density sound-track from the domain of the invention.

It is, of course, to be understood that although a particular color, that is, a red, for the sound-track has been particularly described, that other colors and other toning solutions are not thereby excluded.

Although applicant has illustrated the principle of his invention by describing the steps of a novel process which result in a novel product, nevertheless, it is to be understood that the particular manipulation described and the product formed do not exhaust the possible manipulations and products lying within the domain of the invention.

What I claim as new and desire to secure by Letters Patent of the United States, is:

1. The method of making a combined sound and color photograph which comprises, first, making a red color selection negative and a green color selection negative, and a sound record negative, then forming, in positive stock, a latent image from the red color selection negative adjacent the emulsion face of the positive stock, and a latent image from the green color selection negative and a latent sound record from the sound record negative, both adjacent the carrier of the positive stock, then developing the latent image adjacent the face of the emulsion and toning, with a metal salt, the developed image, then clearing with a potassium bichromate bath, then developing the latent sound record and that the latent image adjacent the carrier, then fixing, then toning the last developed images with a metal salt toning solution.

2. The method of making a combined sound and color photograph which comprises, first, making a red color selection negative and a green color selection negative, and a sound record negative, then forming, in positive stock, a latent image from the red color selection negative adjacent the emulsion face of the positive stock, and a latent image from the green color selection negative and a latent sound record from the sound record negative, both adjacent the carrier of the positive stock, then developing with a hydroquinone developer the latent image adjacent the face of the emulsion and toning the developed image with a ferric salt, then clearing with a potassium bichromate bath, then developing with diamidophenol the latent sound record and the latent image adjacent the carrier, then fixing, then toning the last developed images with a cupric salt toning solution.

JOSEPH B. HARRIS, Jr.